Patented Dec. 31, 1929

1,741,834

UNITED STATES PATENT OFFICE

FRANZ FISCHER, OF MULHEIM-ON-THE-RUHR, GERMANY

PROCESS FOR PURIFYING GASES FROM ORGANICALLY-COMBINED SULPHUR

No Drawing. Application filed October 31, 1927, Serial No. 230,194, and in Germany December 24, 1926.

This invention relates to a process for the catalytic purification of gases especially from the organic sulphur compounds contained therein. More particularly the invention relates to a process of that kind, wherein the composition of the gases, for instance of water-gas, is not catalytically modified in any other manner, as this is the case for instance when iron, cobalt and nickel are used as catalyzers in a known manner.

I have found that certain precious metals, as gold and silver, possess the desired properties when they are used as contact substances in one of the commonly known manners by giving them a large surface and in a fine distribution. The said catalytic means to be used according to the present invention, when compared with lead and antimony which have already been proposed for the same purpose, show the advantage that they are effective at considerably lower temperatures of about 200 to 300° C.

Otherwise the proceeding is, however, an analogous one.

The process can be carried out under ordinary, reduced or increased pressure.

Example

Asbestos fibres are impregnated with a solution of nitrate of silver, dried and calcined and then brought into suitable tubes or other vessels and heated to 200 to 300° C. Water-gas, which has been freed from hydrogen sulfide but not from the organic sulphur compounds, is then conducted through the tubes. At first a reduction of the silver oxide takes place, whereupon the catalytic action begins, which will become perceptible by the fact that the gas leaving the tube or vessel without noticeable volume alteration smells of hydrogen sulfide. When the hydrogen sulfide is removed hereafter in the usual manner, the treated gas is free of all sulphur compounds.

Having now particularly described and ascertained the nature of my said invention, I declare that what I claim is:—

1. In the process for purifying gases from organically combined sulphur by converting the organic sulphur-combinations into hydrogen sulfide in the presence of hydrogen by means of contact substances and absorption of the hydrogen sulfide formed, the steps which consist in passing the gas at temperatures of at least 200° C. over contact-means containing precious metals of the first group of the periodic system, and then separating the hydrogen sulphide which is formed.

2. In the process for purifying gases from organically combined sulphur by converting the organic sulphur-combinations into hydrogen sulfide in the presence of hydrogen by means of contact substances, and absorption of the hydrogen sulfide formed, the steps which consist in passing the gas at temperatures of at least 200° C. over contact-means containing silver, and then separating the hydrogen sulphide which is formed.

3. In a process for purifying gases from organically combined sulphur by converting the organic sulphur-combinations into hydrogen sulfide in the presence of hydrogen by means of contact substances, and absorption of the hydrogen sulfide formed, the steps which consist in passing the gas at temperatures between 200° C. and 300° C. over contact-means containing silver, and then separating the hydrogen sulfide which is formed.

In testimony whereof I have hereunto set my hand.

PROF. DR. FRANZ FISCHER.